United States Patent [19]

Tremblay

[11] Patent Number: 4,811,869

[45] Date of Patent: Mar. 14, 1989

[54] POWDER DISPENSER

[76] Inventor: Roger Tremblay, 380 Salaberry St.,, West Mercier, Canada, J0L 1K0

[21] Appl. No.: 68,101

[22] Filed: Jun. 25, 1987

[51] Int. Cl.[4] ............................................. G01F 11/28
[52] U.S. Cl. .................... 222/440; 222/447; 222/501; 222/546; 141/340
[58] Field of Search ........ 222/308, 501, 476, 445–450, 222/438, 440, 546; 220/287, 352, 353, 356; 141/340–343

[56] References Cited

U.S. PATENT DOCUMENTS

| | | | |
|---|---|---|---|
| 398,390 | 2/1889 | Greeley | 141/343 |
| 627,796 | 6/1899 | Beck | 222/446 X |
| 777,670 | 12/1904 | Frazer | 141/343 |
| 874,351 | 12/1907 | Stover | 222/547 X |
| 1,339,562 | 5/1920 | Hurt | 141/343 X |
| 2,450,155 | 9/1948 | Packwood | 222/482 X |
| 2,601,359 | 6/1952 | Berwick | 222/446 X |
| 2,752,082 | 6/1956 | Nergaard | 141/340 X |
| 2,852,170 | 9/1958 | Reynolds | 222/439 |
| 2,873,050 | 2/1959 | Halverson | 222/158 |
| 3,128,915 | 4/1964 | Matter | 222/501 X |
| 3,358,886 | 12/1967 | Provenza | 222/158 |
| 4,230,239 | 10/1980 | Birrell | 222/448 X |
| 4,337,880 | 7/1982 | Rozmus | 222/447 X |
| 4,418,843 | 12/1983 | Jackman | 222/158 |

Primary Examiner—Kevin P. Shaver
Assistant Examiner—Gregory L. Huson

[57] ABSTRACT

A device for dispensing a predetermined amount of powder from a storage chamber and including a lower measuring chamber. The amount of powder delivered from the measuring chamber is rigourously constant from dispensing stroke to dispensing stroke. The capacity of the measuring chamber can be finely adjusted in accordance with a graduation scale. The dispenser includes a pair of valves and a pusher rod actuating the valves, the lower valve closable under gravity, the upper valve being biased by a single coil spring mounted around the rod. The biasing coil spring is shielded by a sleeve from both chambers, so that the powder never comes in contact with the coil spring.

4 Claims, 4 Drawing Sheets

POWDER DISPENSER

FIELD OF THE INVENTION

This invention relates to dispensing devices, and more specifically to a dispenser for distributing a predefined amount of dry powder from a container.

BACKGROUND OF THE INVENTION

A dispenser device for granular material is disclosed for example in the U.S. Pat. No. 2,852,170 issued in 1958 to Edward Reynolds. In this patent, there is provided an measuring or loading chamber 10, and two valves 17, 22, adapted to selectively close the inlet and outlet ports of the loading chamber. Valves 17, 22, are actuated by a push rod 18, and biased by two coil springs 25, 30, in relation to the closing/opening of the chamber ports, spring 25 always remaining within chamber 10 while spring 30 normally partially engages this chamber. The capacity of measuring chamber 10 can be adjusted by screwing or unscrewing lower port 31.

One major disadvantage of such a construction is that the range of capacity of adjustment is very limited due to the valving arrangement. Another disadvantage is that the powder will quickly come to clog both springs 25 and 30 (and especially spring 25) and thus impair their efficiency. It may further have a contaminant effect with respect to the powder. Moreover, in the position of FIG. 4, where the valves 17 and 25 abut against each other in the final powder dispensing step, powder may very well become trapped within the small chamber defined by the two registering cavities made in the valves 17 and 25, so that the amount of powder falling through the lower port 23 may vary from dispensing stroke to dispensing stroke. Also, the upper port of the chamber being counterbored for providing a seat for the upper valve, this is disadvantageous because it is prone to rapid wear.

OBJECTS OF THE INVENTION

The main object of the present invention is to increase the efficiency of powder dispensing devices of the type capable of delivering a variable amount of powder.

A further object of the invention is to provide such a device with a powder measuring chamber, the inner volume of which can be precisely adjusted within a large range to accordingly vary the volume of dispensed powder.

Still another object of the invention is that the above device delivers rigourously constant amounts of powder from dispensing stroke to dispensing stroke.

SUMMARY OF THE INVENTION

In accordance with the objects of the present invention, there is disclosed a powder dispensing device consisting of: a powder container, a lower funnel member mounted to the lower portion of said container, an upper funnel member movably mounted within said container above said lower funnel member so that a measuring chamber of variable capacity be defined therebetween, the measuring chamber having outlet and inlet ports defined by said lower and upper funnel members, respectively, a lower valve member closing said outlet port under gravity; an upper valve member adapted to close said inlet port; a push rod, mounted into said container for vertical movement through said ports and defining a lower end portion projecting outwardly from said container, said lower and upper valve members operated by said push rod; a lower valve abutment carried by said push rod spacedly below sid lower valve member; a biasing member, mounted around said main push rod spacedly above said funnel members, and defining a lost motion connection between said push rod and said upper valve member, and a sleeve surrounding said biasing member and shielding the same from the powder.

In the rest position of the dispenser, the lower valve is closed while the upper valve is opened, so that powder flows down from the upper storage chamber into the measuring chamber. Lifting of the push rod first closes the upper valve through the biasing member and then opens the lower valve through the lower valve abutment. The push rod, upon being released, moves down under gravity and bring back both valve members to their rest position. The level of the upper funnel is finely adjustable within a large range to adjust the volume of the measuring chamber. The shielding sleeve carries the upper funnel and is screwed on a manually rotatable screw accessible at the top of the container. Means are preferably provided to keep constant the gap between the inlet port and the opened upper valve member for all adjusted positions of the upper funnel.

BRIEF DESCRIPTION OF THE DRAWINGS

FIG. 1a is a cross-sectional view of the powder dispensing assembly, taken along line 1a–1a of FIG. 1.

DETAILED DESCRIPTION OF THE INVENTION

Figure 1:
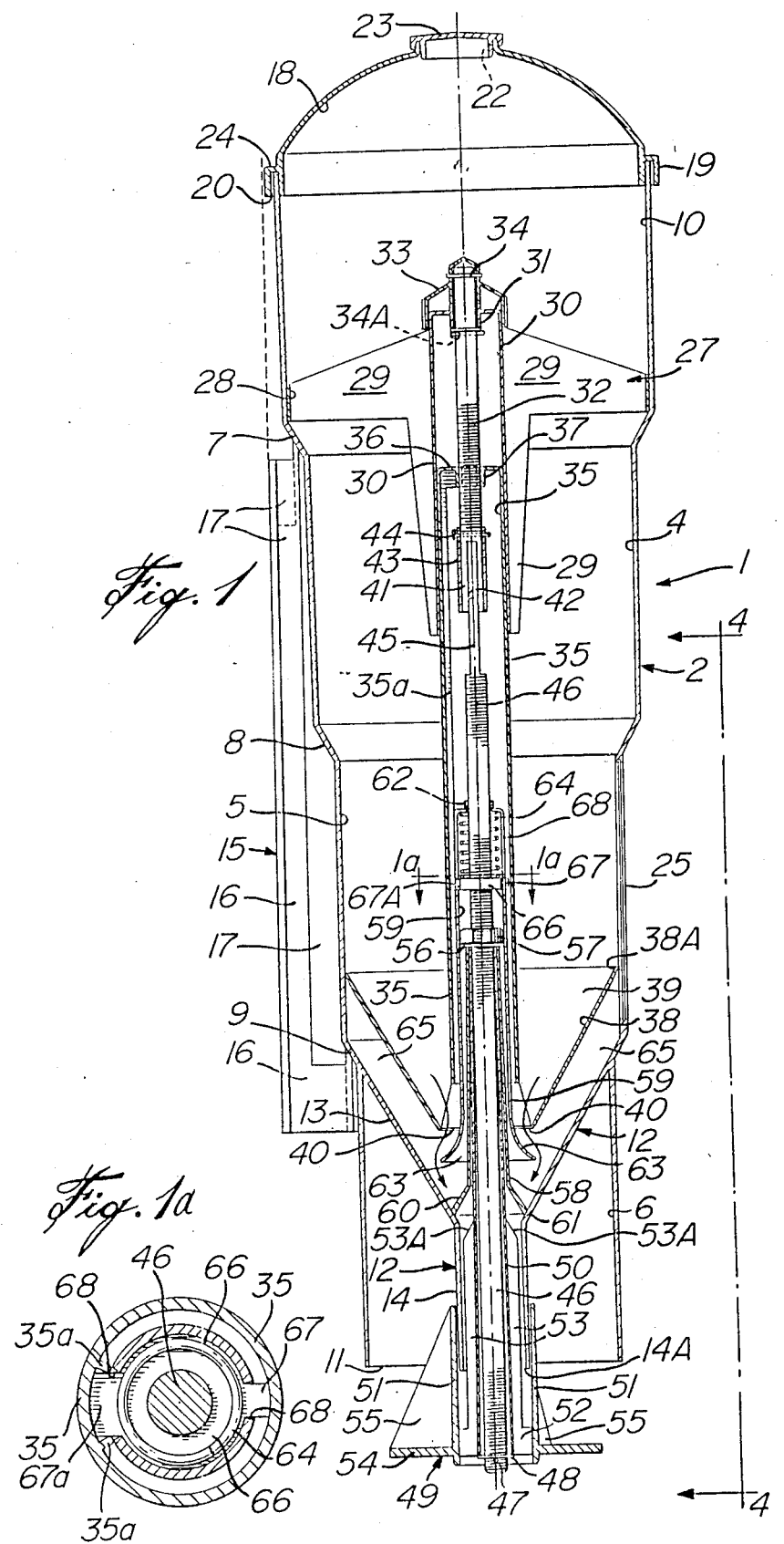
FIGS. 1 to 3 are sectional elevational views of a powder dispenser constructed in accordance with the teachings of the invention, sequentially showing how the elements thereof interact during a powder-dispensing stroke.

The powder dispenser 1 includes an elongated tubular casing 2 defining four sections 3 to 6, of progressively-decreasing diameters. Three inturned offsets 7 to 9 are thereby defined between the triplet of pairs of sections 3-4, 4-5, and 5-6, respectively. The top mouth 10 of uppermost section 3 is about 50% larger diametrally than the bottom mouth 11 of the lower section 6. From the lowermost offset 9 inwardly depends a lower funnel member 12, defining a conical portion 13 integral with and having the same slope than offset 9, and a tubular portion 14 coaxial with casing sections 3 to 6 and about three times smaller diametrally than bottom mouth 11 and the mouth 14A of which extends beyond mouth 11. A two part support bracket 15 serves to removably fix casing 2 in upright position to a wall. Outer part 16 is screwed to the wall while inner part 17, integral with casing 2, vertically slides within outer part 16. A dome-shaped, semi-spherical cover 18 is provided, to close top mouth 10. Cover 18 includes a peripheral radially-outturned flange 19 forming a downturned annular channel 20 adapted to releasably engage the circular top edge of mouth 10, to close same. Cover 18 further includes a central through-bore 22 at its apex, normally closed by a seal plug 23. The cover flange 19 further defines an annular top seat 24 on the opposite side of channel 20, whereby upon pulling out plug 23 from cover 18 and cover 18 from casing 2, and inverting cover 18, the latter can become a funnel member by making the flange seat 24 abut against said circular top edge of mouth 10 of casing section 3. Cover 18 facilitates refilling of casing 2.

Figure 4:
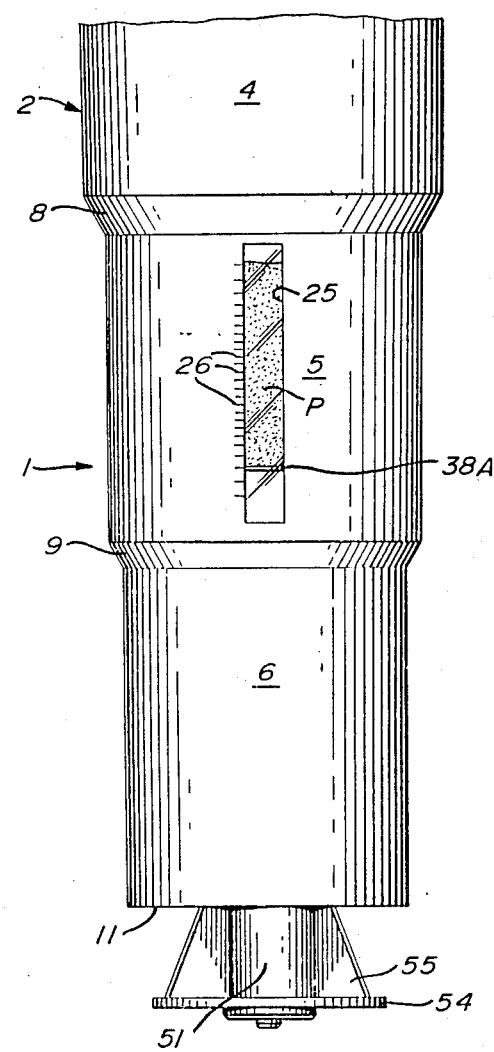
FIG. 4 is a fragmentary elevational view of the lower half of the powder dispenser, taken along line 4—4 of FIG. 1, and showing the scale and window for indicating the adjusted capacity of the measuring chamber and if any powder remains in the container.

An upper, vertically-adjustable funnel 38 is located within section 5. The part of casing 2 above funnel 38 forms a storage chamber designed to store free-flowing, dry, granular material such as powder P (see FIG. 4). A longitudinal rectangular window 25 is further provided in the wall of casing section 5, on the side opposite the support bracket 15 and immediately above lower funnel 13. Window 25 is made of a transparent material and includes a longitudinal graduation scale 26, which may go from 0 to 28 ounces. The level of powder remaining in casing section 5 can be seen through window 25 to indicate refilling time. More importantly, the upper edge 38A of adjustable funnel 38 is seen through window 25 and gives a reading on scale 26 on the volume of powder P in the measuring chamber 65 defined between lower funnel 13 and upper funnel 38.

It should be noted that transparent window 25 is cross-sectionally straight and that upper edge 38A of funnel 38 is notched to receive and fit window 25. Thus, funnel 38 can slide up and down along window 25 but cannot rotate in the casing 2.

A support member 27 is provided within casing section 3, defining an annular wall 28 resting on the offset and which can be riveted to section 3. Four radial legs 29 are secured to wall 28 and in turn support a vertical tube 30. Tube 30 is coaxial with casing 2 and downwardly extends for more than half the length of casing section 4. Tube 30 has a top rod-guiding sleeve 31 through which rotatably extends the top, unthreaded part of a threaded rod 32, to the top end of which is anchored an outturned hollow knob 33, by a locking pin 34. Knob 33 serves to rotate rod 32 and to suspend the same from the top of tube 30. A locking pin 34a, under a washer, engages rod 32 and prevents upward withdrawal of rod 32 relative to guide sleeve 31.

A sleeve 35 is slidingly mounted at its top end within tube 30, and includes an inturned annular flange 36 at its top end defining a central downturned inwardly-threaded short sheath 37 for meshing with the threads of rod 32. Sleeve 35 extends downwardly for about half the total length of the dispenser 1, and supports at its lower portion the upper funnel 38 by means of radial webs 39. More particularly, the top annular edge 38A of funnel 38 freely abuts against the interior face of casing section 5, and registers with window 25 to constitute a marker for scale 26. The angle of the walls of funnel 38 relative to the longitudinal axis of supporting sleeve 35 is about 30 degrees. The bottom end of sleeve 35 stops at an intermediate section of the central portion of funnel 38, so that the powder P can freely exit through the bottom mouth 40 of movable funnel 38 which is diametrally larger by about 50% relative to the diameter of sleeve 35.

The slopes of the wall 13 of funnel 12 and of that of funnel 38 should be identical. The cover 18 being removed, by hand-rotating knob 33, one can adjust the relative distance between these two funnels 12 and 38 by displacing the movable funnel 38 from a lower limit position, in which funnel 38 is close to funnel 12, to an upper limit position where the sleeve top flange 36 is close to the uppermost thread of the threaded rod 32, just below locking pin 34A. Hence, precise adjustment of the spacing between funnels 12 and 38 can be effected, and this within a wide range of adjustments. This is important as we will see below.

The lower end of rod 32 is split to define two prongs 41 which define an intermediate cavity 42 generally of rectangular cross-section. The prongs 41 are reinforced by a collar 43 connected to a rod 32 by a transverse cotter pin 44. The top flattened end portion 45 of a push rod 46 is slidingly engaged in cavity 42. Hence, rotation of upper funnel adjusting screw 32 will cause rotation of push-rod 46 but the latter can move axially relative to screw 32.

Push-rod 46 extends coaxially of casing 2 downwardly beyond bottom mouth 14A of funnel 12. Push-rod 46 is threaded throughout its length and carries at its bottom end via a transverse pin 47 and a washer 48 an annular push-rod actuating and guiding assembly 49 which consists of an inner sleeve 50, an outer sleeve 51 joined to the inner sleeve 50 by the lower enlarged end portions 52 of radial flanges 53, an annular push plate 54 surrounding the lower end of outer sleeve 51 and reinforced by radial, triangular webs 55. The inner sleeve 52 abuts at its top end against a washer 56 which is tightened by an overlying screw nut 57 which is screwed on push rod 46. Thus, assembly 49 is fixed to push-rod 46. Outer sleeve 51 slidingly engages at its upper end around tubular position 14 of funnel 12. Thus, outer sleeve 51 and flanges 53 guide push rod 46 in its up and down movement.

There are further provided two valve members, namely a lower valve member 58 and an upper valve member 59. Lower valve member 58 consists of a tube slidably surrounding inner sleeve 50, adapted to abut against washer 56 at its top end and forming a downwardly flaring end portion 60 adapted to seat on the throat 60 of the lower funnel 13, said throat forming the outlet port of measuring chamber 65. The upper valve member 59 consists of a tube which surrounds the tube of lower valve member 58, the nut 57, and extends upwardly to be terminated by a bushing 62 which has a sliding fit with push-rod 46. The tube of valve member 59 has a bottom, downwardly flaring end portion 63, which is slightly curved to seat upwardly against funnel mouth 40 which forms the inlet port of measuring chamber 65.

A coiled spring 64 surrounds push-rod 46 and abuts against top bushing 62 of upper valve member 59 and against a nut 66 screwed on push-rod 46. Nut 66 has opposed lateral ears 67, 67A, slidable in longitudinal slots 68 made in the top part of the tube of upper valve member 59. The wider ear 67a (see FIG. 1a) is also engaged between two internal, longitudinal ribs 35a on upper funnel sleeve 35. Thus, nut 66 and valve member 59 are prevented from rotating by sleeve 35 which cannot rotate because funnel 38 cannot rotate as previously explained. Spring 64 biases upper valve member 59 upwardly relative to push-rod 46 until ears 67 abut against the lower ends of slots 68. The threads of both rods 32 and 46 have the same pitch. Upon rotation of rod 32 by knob 33 for adjusting the level of upper funnel 38, push-rod 46 screws up or down within nut 66 to the same extent so that the gap being inlet port 40 and flared end 63 of valve member 59 remains constant.

FIG. 1 shows the dispenser in rest position with the lower valve 58, 60, closing the outlet port 61 and the upper valve member 59, 63, opening the inlet port 40. It is noted that the level of the upper funnel 38 and of the upper valve member 59, 63, can be varied as a unit while push assembly 49 remains at the same level for convenience of the operator.

Each flange 53 of push assembly 49 defines a top outwardly-downwardly bevelled edge 53A adapted to mate with the inside of the flared lower end 60 of lower valve member 58. In rest position, edges 53A are spaced downwardly from valve lower end 60.

Figure 2:
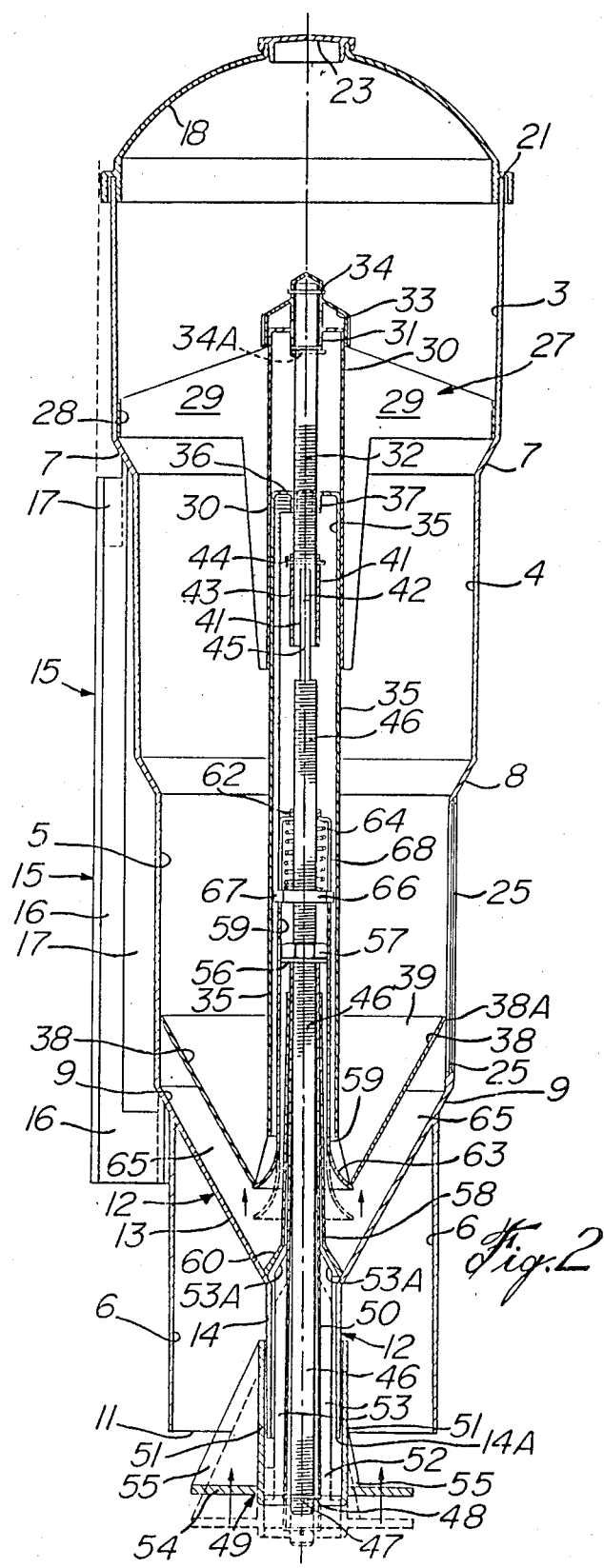
Figure 3:
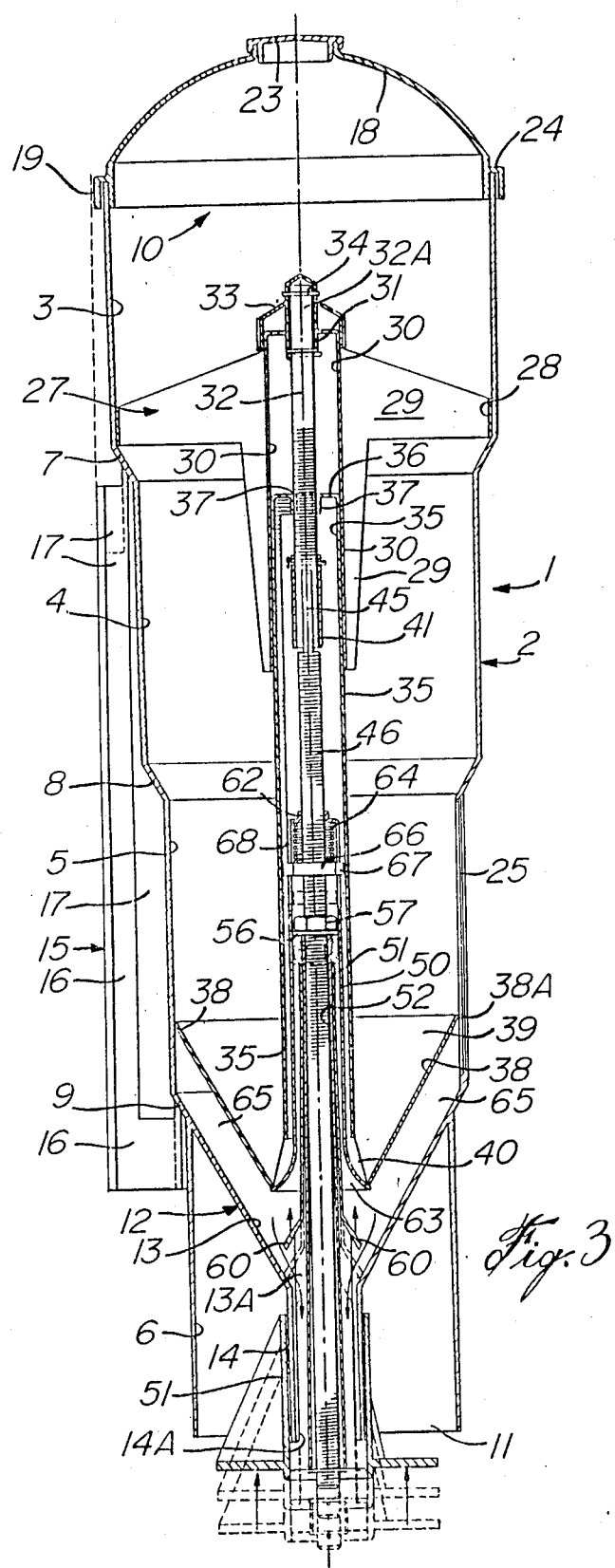

In operation, the dispenser 1 is normally in the rest position shown in FIG. 1, with upper valve member 63 being opened for admission of material from the storage chamber 65, while the lower valve member 58, 60, is closed under gravity, under its own weight and that of push rod 46 and of assembly 49. Upon initial upward movement of push assembly 49 and push rod 46, see FIG. 2, lower valve member 58, 60, remains closed under its own weight and that of the powder P in measuring chamber 65 while nut 66 and spring 64 push upper valve member 59, 63, to inlet port closing position. Further upward movement of push assembly 49 and push-rod 46 (FIG. 3) causes compression of spring 64 to tightly seal the inlet port, and edges 53A of flanges 53 engage and lift the lower valve member 58, 60, to open position so that powder P in the measuring chamber 65 is dispensed through tubular portion 14 and outer sleeve 51 of assembly 49. After release of push assembly 49, the rest position of FIG. 1 is resumed.

The present powder dispenser is especially useful in dairy farms and in the dairy industry in general, where powder detergents and desinfecting agents have to be mixed and dissolved in water in definite proportions to provide a washing solution for the receptacles and apparatuses. Another application is in the pouring of specified amounts of bactericidal powders in the water of a swimming pool, at regular intervals as is known.

The present invention is thus specifically directed to a powder dispenser provided with a measuring chamber and characterized in that the dispenser will yield a precisely monitored amount of powder at each dispensing stroke thereof, and furthermore that the capacity of the measuring chamber can be very precisely adjusted by hand.

What I claim is:

1. A powder dispensing device comprising: a powder container, a lower funnel member fixedly mounted to the lower portion of said container, an upper funnel member movably mounted within said container above and coaxial with said lower funnel member for up-and-down movement between an upper and a lower limit position, so that a measuring chamber of variable capacity be defined therebetween, said lower and upper funnel members forming at their lower, smaller ends an outlet and an inlet port for said measuring chamber, respectively, a lower and an upper valve member mounted in said measuring chamber to close said outlet and inlet ports, respectively, said upper funnel member having a top edge slidable along the inner surface of said container; a transparent window in the wall of said container registering with the top edge of said upper funnel member in all positions of the latter, so that said top edge be visible from the outside of said container; a push rod mounted within said container for longitudinal movement through said ports and defining a lower end portion projecting outwardly from said container; a biasing member carried by said push rod and upwardly biasing said upper valve member, said lower valve member free to close said outlet port under gravity, an abutment member carried by said push rod below said lower valve member to raise the latter to open said outlet port during upward movement of said push rod, said valve members each including a sleeve, provided with a bottom downwardly flared end, each sleeve surrounding said push rod, the sleeve of the upper valve member surrounding the sleeve of the lower valve member and said biasing member, and forming a bushing at its top end bearing on said biasing member, whereby upon the initial part of said upward movement of said push rod froma lower limit position in which said lower valve member closes said outlet port but said upper valve member opens said inlet port, said upper valve member is pushed by said biasing member to close said inlet port, and upon the last part of said upward movement of said push rod, effected against the bias of said biasing member, said abutment member raises said lower valve member to allow outflow of the powder from said measuring chamber; and manually-operated means to adjust the level of said upper funnel member including a threaded rod coaxial with said push rod thereabove, an elongated sleeve integral with said upper funnel member at its bottom end and threadedly engaging said threaded rod at its top end; a supporting member supported by said container and supporting the top end portion of said threaded rod, said window constituting means engaging the top edge of said upper funnel to prevent rotation of the latter, and knob means fixed to the top end of said threaded rod to rotate the same and thus adjust the level of said upper funnel member.

2. A device as in claim 1, further including a scale inscribed along said window, said top edge of said upper funnel forming a marker coacting with said scale to give a reading on said scale of the volume of said measuring chamber.

3. A device as in claim 1,
wherein the lower end of said threaded rod includes a longitudinal cavity, being longitudinally slidingly engaged by a cross-sectionally smaller upper end portion of said push-rod, said cavity and upper end portion shaped to cause rotation of said push-rod by said threaded rod, said push rod having threads of the same pitch as those of said threaded rod, a nut threaded on said push-rod and serving as a carrier for said biasing member and non-rotatably engaging but longitudinally movable relative to the sleeve of the upper valve member, and means to prevent rotation of said nut, whereby rotation of said threaded rod to adjust the level of said upper funnel member will concurrently adjust the level of said upper valve member to the same extent by rotation of said push rod relative to said nut.

4. A dispenser as in claim 3,
wherein said lower funnel member has a lower tubular portion, and further including a push assembly including a tube surrounding and anchored to said push-rod below said lower valve member, said tube having at least three longitudinal flanges radially outwardly protruding from said tube and guided by said tubular portion, the top edge of each such flange being bevelled to conform to the shape of said lower valve member flared end, said flanges top edges constituting said abutment member.

* * * * *